R. S. DUNHAM.
Draft-Regulating Damper.
No. 8,693. Reissued May 6, 1879.
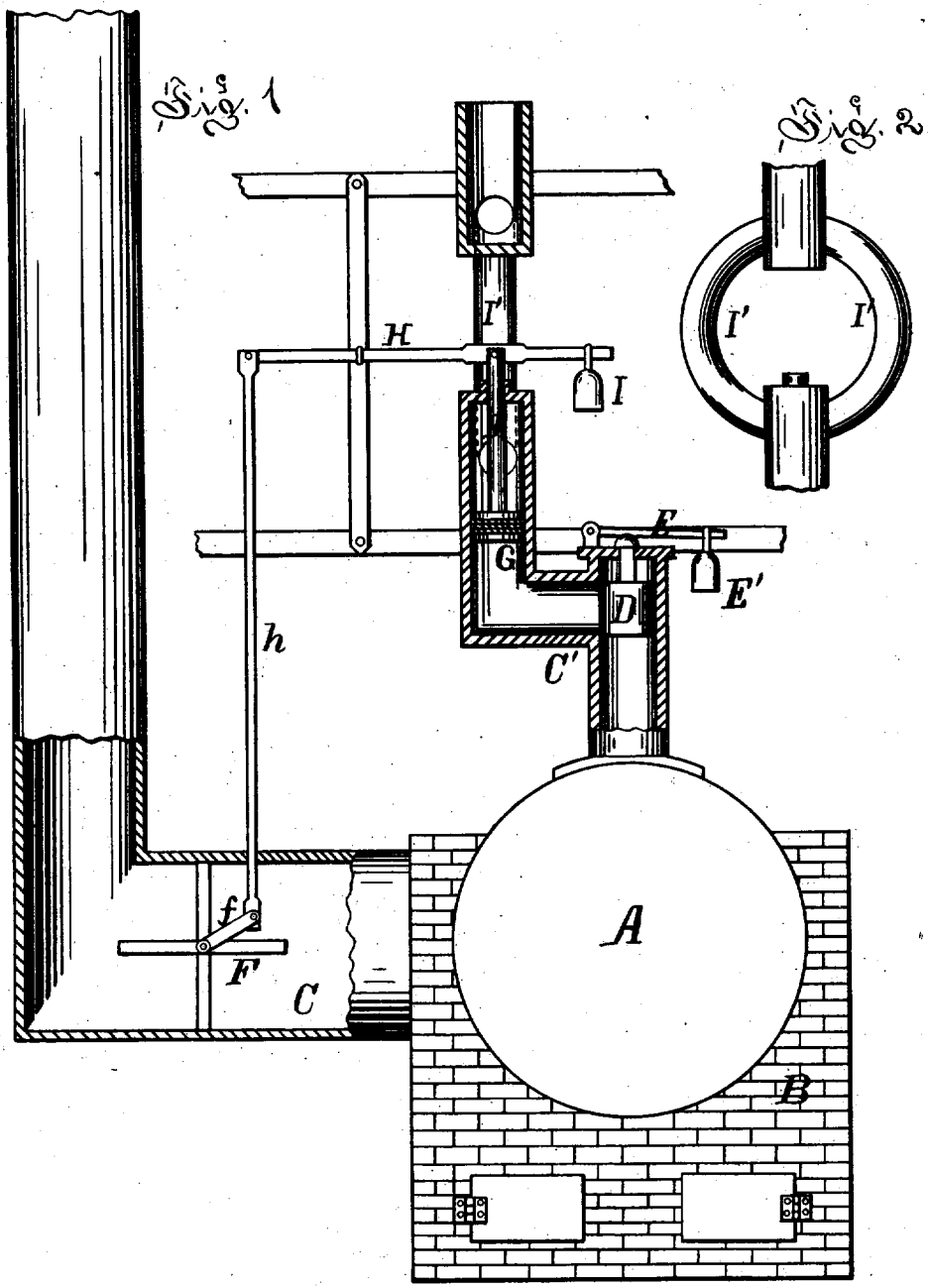
Witnesses:
Geo. H. Carlisle
Charles B. Lothrop
Inventor:
R. S. Dunham
N. PETERS, PHOTO-LITHOGRAPHER, WASHINGTON, D. C.

UNITED STATES PATENT OFFICE.

ROYAL S. DUNHAM, OF COLD WATER, MICHIGAN.

IMPROVEMENT IN DRAFT-REGULATING DAMPERS.

Specification forming part of Letters Patent No. 152,089, dated June 16, 1874; Reissue No. 8,693, dated May 6, 1879; application filed February 26, 1879.

*To all whom it may concern:*

Be it known that I, ROYAL STILES DUNHAM, of the city of Cold Water, in the county of Branch and State of Michigan, have invented a new and valuable Improvement in Draft-Regulating Dampers for controlling the draft of the fire under or for steam-boilers; and I do hereby declare that the following is a full, clear, and exact description of the construction and operation of the same, reference being had to the annexed drawings, making a part of this specification, and to the letters and figures of reference marked thereon.

Figure 1 of the drawings is a vertical section. Fig. 2 is a detail.

This invention relates to dampers for the furnaces of steam-boilers; and the novelty consists in the herein-described method of establishing a connection between the safety-valve and the damper, whereby the full force of the steam-pressure in the boiler is automatically applied to operate the damper when the steam-pressure exceeds the pressure of the safety-valve.

The object of the invention is to regulate the draft in accordance with the steam-pressure desired, so as to maintain an even steam-pressure and prevent the waste of fuel.

In the drawings, A represents a steam-boiler; B, the furnace; C, the draft-flue or smoke-stack; C′, a safety-valve pipe, within which is a safety-valve, D, of which E is the lever, and E′ the weight. F represents the damper pivoted within the flue C, and provided with a crank-arm, *f*. G is a piston in a continuation of the safety-valve pipe. H is a lever pivoted near one end to the rod *g* of the piston G, and at the other end to the rod *h*, by which it is connected with the crank *f* of the damper. I is a weight hung on the lever H, and capable of adjustment in any desired position on the lever H. I′ I′ are escape-pipes, which may be added to the damper-regulator to permit the escape of steam from the boiler. The lever H is pivoted near its center to any convenient support.

When there is no steam in the boiler, or when the steam-pressure is less than the resistance of the valve D, the weight I keeps the damper open and allows a free draft. When the steam-pressure in the boiler exceeds the resistance of the valve D, the valve D opens, the full force of the steam in the boiler acts upon the piston G, raising the piston, and, by means of the connections shown between the piston G and the damper F, closes the damper and shuts off the draft.

When the pressure in the boiler falls the safety-valve D closes, and the damper is opened by the weight I, the steam between the safety-valve and the piston soon condensing.

It is obvious that the safety-valve D may be set at any desired pressure up to the limit allowed by law for the boiler.

I claim as my invention—

1. The combination, with the damper F, having crank-arm *f*, of the pipe C′, provided with the lateral escapes I′ I′, safety-valve D, packed piston G, weighted sliding lever H, and connecting-rod *h*, substantially as and for the purpose specified.

2. The combination of the boiler A, pipe C′, safety-valve D, piston G, and damper F, with suitable intermediate mechanism, arranged substantially as and for the purpose specified.

3. The combination of the boiler A, pipe C′, valve D, piston G, damper F, and weighted lever H, having the connecting-rod *h*.

R. S. DUNHAM.

Witnesses:

JNO. A. WEIR,

GEO. H. CARLISLE.